(12) United States Patent
Milliere et al.

(10) Patent No.: US 12,404,035 B2
(45) Date of Patent: Sep. 2, 2025

(54) AIRCRAFT COMPRISING A DIHYDROGEN TRANSPORT LINE, A CHANNEL FOR EMBEDDING SAID TRANSPORT LINE AND A SYSTEM FOR EVACUATING AIR AND WATER PRESENT IN SAID EMBEDDED CHANNEL

(71) Applicant: Airbus Operations SAS, Toulouse (FR)

(72) Inventors: Jérôme Milliere, Toulouse (FR); Romain Joubert, Toulouse (FR); Marc Casteran, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/618,261

(22) Filed: Mar. 27, 2024

(65) Prior Publication Data

US 2024/0327024 A1  Oct. 3, 2024

(30) Foreign Application Priority Data

Mar. 29, 2023  (FR) ..................................... 2303001

(51) Int. Cl.
*B64D 37/30* (2006.01)
(52) U.S. Cl.
CPC ................... *B64D 37/30* (2013.01)
(58) Field of Classification Search
CPC ...... B64D 37/00; B64D 37/005; B64D 37/30; B64D 37/32; F16K 24/00; F16K 24/04; B60K 15/00; B60K 15/01
See application file for complete search history.

(56) References Cited

U.S. PATENT DOCUMENTS

| | | |
|---|---|---|
| 2015/0246731 A1 | 9/2015 | Tateiwa |
| 2017/0267368 A1 | 9/2017 | Hara et al. |
| 2021/0078702 A1 | 3/2021 | Ciet et al. |
| 2022/0289396 A1 | 9/2022 | Horde et al. |
| 2023/0086167 A1 | 3/2023 | Milliere et al. |
| 2023/0294510 A1* | 9/2023 | Orchard ................ F16L 3/1091 60/734 |
| 2023/0339621 A1* | 10/2023 | Sarkar ........................ F02C 3/22 |

FOREIGN PATENT DOCUMENTS

| | | |
|---|---|---|
| EP | 4056477 A1 | 9/2022 |
| FR | 3100799 A1 | 3/2021 |
| FR | 3127203 A1 | 3/2023 |

OTHER PUBLICATIONS

French Search Report for corresponding French Patent Application No. 2303001 dated Sep. 21, 2023.

* cited by examiner

*Primary Examiner* — Nicholas McFall
(74) *Attorney, Agent, or Firm* — Greer, Burns & Crain, Ltd.

(57) ABSTRACT

An aircraft with a dihydrogen transport line, an embedded channel having a gutter in which the transport line is fixed and having a first end by which the transport line enters into the gutter and a second end by which the transport line leaves the gutter, and an evacuation system fluidically connected between the second end of the gutter and the outside of the aircraft for the evacuation of air and of water.

5 Claims, 5 Drawing Sheets

AIRCRAFT COMPRISING A DIHYDROGEN TRANSPORT LINE, A CHANNEL FOR EMBEDDING SAID TRANSPORT LINE AND A SYSTEM FOR EVACUATING AIR AND WATER PRESENT IN SAID EMBEDDED CHANNEL

CROSS-REFERENCES TO RELATED APPLICATIONS

This application claims the benefit of French Patent Application Number 2303001 filed on Mar. 29, 2023, the entire disclosure of which is incorporated herein by way of reference.

FIELD OF THE INVENTION

The present invention relates to the field of aircraft and, in particular, aircraft for which the energy source is liquid or gaseous dihydrogen, whether for supplying a fuel cell or directly supplying the combustion chamber of an engine. The present invention thus relates to an aircraft comprising a dihydrogen transport line, an embedded channel which allows the passage of the transport line and a system for evacuating water and air present in the embedded channel.

BACKGROUND OF THE INVENTION

It is known practice to use dihydrogen as energy source in an aircraft. The dihydrogen is stored in a tank and a transport line ensures the transportation of the dihydrogen from the tank to the consumer device, such as, for example, a fuel cell or the combustion chamber of an engine.

To secure the transportation of the dihydrogen, an embedded channel in which the transport line is housed and fixed can be used for each transport line.

In this type of installation, water may have stagnated in the embedded channel and it may be that dihydrogen escapes from a transport line.

It is therefore desirable to provide an installation which ensures the evacuation of the water and of the air or of the dihydrogen present in the embedded channel to the outside.

SUMMARY OF THE INVENTION

One object of the present invention is to propose an aircraft comprising a dihydrogen transport line, an embedded channel which allows the passage of the transport line and a system for evacuating air and water and dihydrogen in the event of a leak.

To this end, an aircraft is proposed comprising:
  at least one transport line in which dihydrogen flows, between, upstream a tank and downstream a consumer device,
  for each transport line, an embedded channel comprising a gutter in which the transport line is fixed and having a first end by which the transport line coming from upstream enters into the gutter and a second end by which the transport line going downstream leaves the gutter, and
  for each second end, an evacuation system fluidically connected between the second end of the gutter and the outside of the aircraft and intended to ensure the evacuation of air and water.

With such an arrangement, the water and the air present in the transport line are sucked over the entire length of said transport line. Indeed, with such an arrangement, the circulation of air in the transport line is forced, by virtue of a pressurization at the first end of the transport line so as to force the air to circulate in the transport line, and of the resulting suction of the air in the transport line to the second end of the transport line (creating a depression). This makes it possible to maximize a dilution of dihydrogen in the air in the event of a dihydrogen leak.

Advantageously, the evacuation system comprises a first line with a proximal end, a distal end and a bend between said proximal end and said distal end, the bend constitutes a low point for the first line, and the first line is fluidically connected to the second end of the gutter by said proximal end and emerges outside at an outer wall of the aircraft by said distal end.

Advantageously, the aircraft comprises a wing and the distal end of the first line emerges on the upper surface of the wing.

Advantageously, the evacuation system comprises a cap which extends outside of the aircraft around the distal end by having a closed face oriented towards the front of the aircraft and an open face oriented towards the rear of the aircraft.

Advantageously, the evacuation system comprises a second line with a proximal end and a distal end, the second line is fluidically connected to the bend by said proximal end and emerges outside of the aircraft at an outer wall of the aircraft by said distal end, and, between the proximal end of the second line and the distal end of the second line, the second line has a downward slope.

Advantageously, the evacuation system comprises a heating element disposed close to said second line.

Advantageously, the distal end of the second line is oriented towards the rear of the aircraft.

BRIEF DESCRIPTION OF THE DRAWINGS

The features of the invention mentioned above, and others, will become more clearly apparent on reading the following description of an exemplary embodiment, said description being given in relation to the attached drawings, in which.

DETAILED DESCRIPTION OF THE PREFERRED EMBODIMENTS

Figure 1:
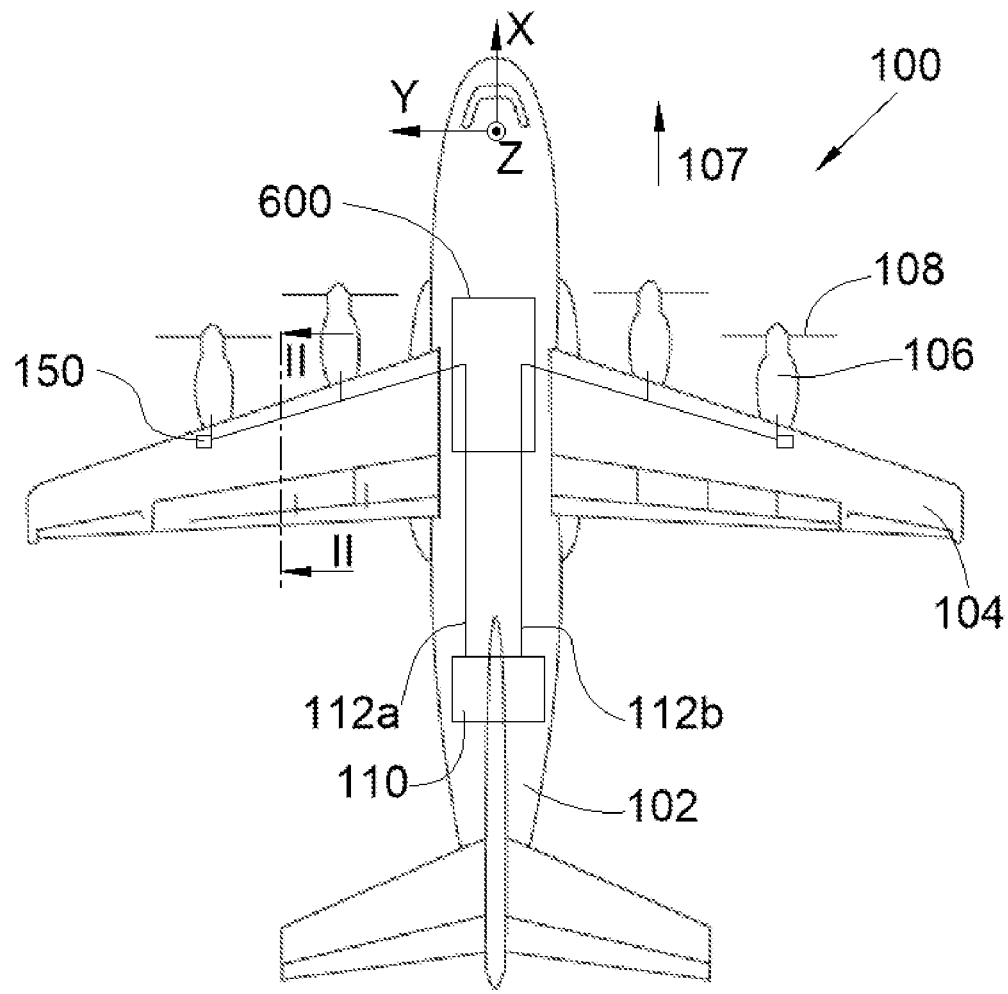
FIG. 1 is a top view of an aircraft according to the invention.

FIG. 1 shows an aircraft 100 which has a fuselage 102 on either side of which is fixed a wing 104. Under each wing 104 there is fixed at least one propulsion system 106.

By convention, X denotes the longitudinal direction of the aircraft 100, Y the transverse direction of the aircraft 100 which is horizontal when the aircraft is on the ground, and Z the vertical direction or vertical height when the aircraft is on the ground, these three directions X, Y and Z being mutually orthogonal.

Also, the terms "front" and "rear" should be considered with respect to a direction of advance of the aircraft 100 when the propulsion systems 106 are operating, this direction being represented schematically by the arrow 107.

In the embodiment of the invention presented here, each propulsion system 106 comprises an electric engine, a propeller 108 mounted on the engine shaft of said electric engine and a fuel cell which supplies the motor with electricity.

The fuel cell is supplied with oxygen and dihydrogen in order to produce electricity.

In another embodiment, the propulsion system 106 can take the form of a jet engine whose fuel is burnt in the combustion chamber and is dihydrogen.

The aircraft 100 also comprises a dihydrogen tank 110 which is disposed here in a rear part of the fuselage, but which could be disposed in another part of the aircraft 100. The dihydrogen can be liquid or gaseous.

To transport the dihydrogen, the aircraft 100 comprises at least one transport line 112*a-b* in which the dihydrogen flows, between, upstream the tank 110 and downstream the consumer device 106 which consumes the dihydrogen and which can here be the fuel cell or the jet engine.

For simplicity of implementation, the transport lines 112*a-b* are preferentially disposed in the upper part of the aircraft 100 and thus extend along the fuselage 102 and the wings 104 in the upper part thereof.

In the embodiment of the invention presented in FIG. 1, there is a transport line 112*a* which extends and ensures the transport of the dihydrogen between the tank 110 and a consumer device 106 on the port side and there is a transport line 112*b* which extends and ensures the transport of the dihydrogen between the tank 110 and a consumer device 106 on the starboard side.

Figure 2:
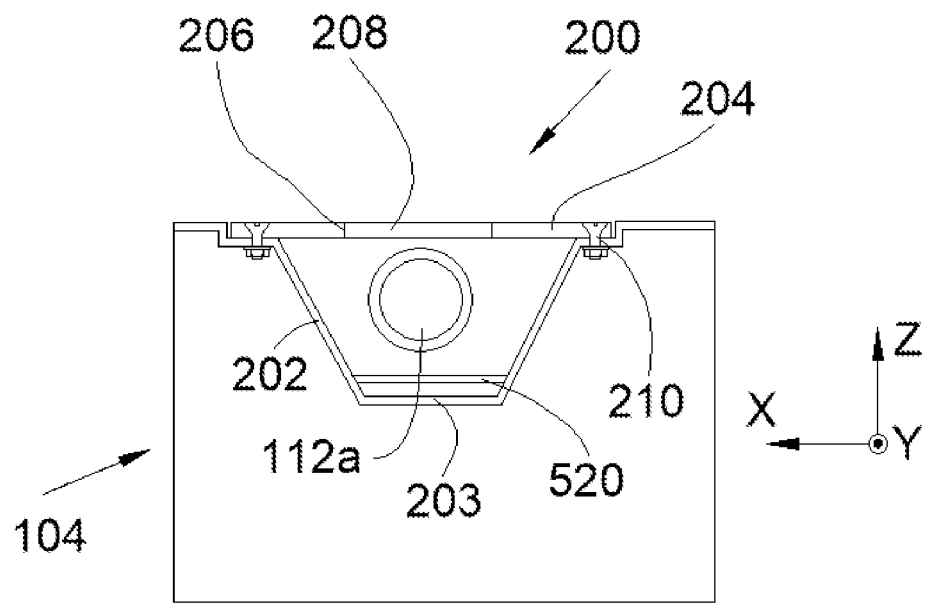
FIG. 2 is a cross-sectional view of a wing of the aircraft of FIG. 1 along the line II-II.

FIG. 2 shows a cross-section of the port-side wing 104 with the transport line 112*a*, but the invention applies in the same way to the starboard side. In the embodiment represented in FIG. 2, the aircraft 100 comprises, for each transport line 112*a*, an embedded channel 200 comprising a gutter 202 in which the transport line 112*a* is housed and fixed.

Figure 3:
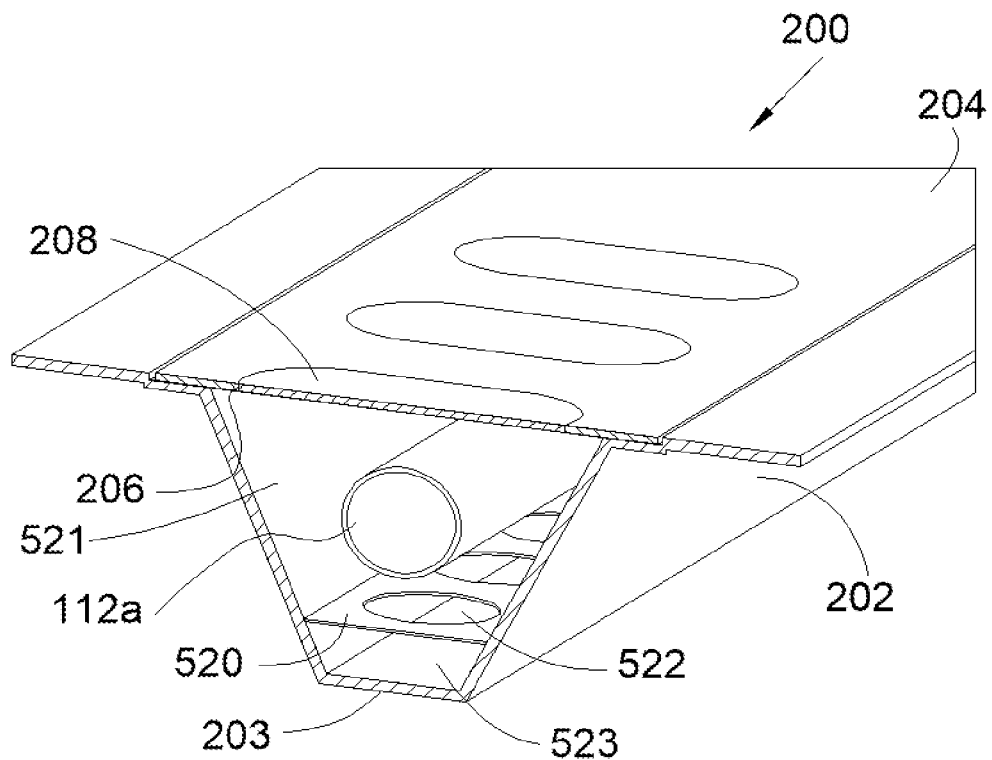
FIG. 3 is a perspective view of an embedded channel according to the invention.

FIG. 3 shows the embedded channel 200 with the gutter 202 which, in the embodiment of the invention presented in FIGS. 2 and 3, comprises a bottom 203, an opening opposite the bottom 203, and a cover 204 which covers the opening of the gutter 202 by at least partly blocking it. The transport line 112*a-b* is thus housed between the bottom 203 and the opening and, here, the cover 204. The transport line 112*a-b* is fixed to the gutter 202 by any appropriate means such as, for example, collars.

In the embodiment of the invention presented in FIGS. 2 and 3, the gutter 202 has a trapezoidal section, but sections of different forms are possible.

The cover 204 here constitutes an outer wall of the aircraft 100, that is to say that it is in direct contact with the outside air surrounding the aircraft 100. The cover 204 is fixed to the outer wall of the aircraft 100 by any appropriate fixing means, such as, for example here, bolts 210.

In the embodiment of the invention presented here, the cover 204 is pierced with ventilation windows 206 which allow the passage of the dihydrogen, particularly in the case of a leak from the transport line 112*a-b*, to the outside, limiting equally the concentration of dihydrogen in the embedded channel 200 and the risks linked to the presence of dihydrogen. Preferentially, the cover 204 is in a higher position with respect to the bottom 203, that is to say on top.

To limit the impact of the ventilation windows 206 on the drag of the aircraft 100 in flight, each ventilation window 206 is closed by a plug 208 produced in a material that breathes for dihydrogen, that is to say that the plug 208 is impermeable to the outside water that may not enter into the embedded channel 200*a-b*, and permeable, among other things, for dihydrogen which is present in the embedded channel 200*a-b* and can be evacuated to the outside. The plug 208 is produced for example in polypropylene or polyethylene.

In the embodiment of the invention presented here, in order to prevent, in the case of fire, the fire from remaining contained in the embedded channel 200 because of the presence of the plugs 208, each plug 208 is composed of a material that can break under the effect of heat, such as for example polypropylene or polyethylene. By breaking under the effect of heat, the plug 208 constitutes a fusible element which makes it possible to open the ventilation window 206 in case of need to blow out the flames. In particular, the material for the plug 208 is chosen so as to break when the temperature inside the gutter 202 reaches a value lower than the maximum acceptable temperature for the gutter 202 and the transport line 112*a-b* installed in the gutter 202, that is to say the temperature above which the integrity of the gutter 202 and of the transport line 112*a-b* is no longer guaranteed.

In case of overpressure, it is also possible to provide for the cover 204 to break under the effect of the overpressure, thus limiting the risks of breaking of the gutter 202. To this end, the tear strength of the cover 204 is lower than the tear strength of the gutter 202, for example through the production of thinner zones. It is also possible to provide for the breaking to be done by means of the cover 204 fixing means, for example by using fusible bolts which break above a certain pressure.

To aerate each embedded channel 200*a-b*, the aircraft 100 comprises an aeration system 600 which is disposed here in the upper part of the aircraft 100 at the join of the wings 104 and which allows the introduction of outside air and allows this air to be sent into each embedded channel 200.

To prevent the attachments which fix the transport line 112*a-b* in the embedded channel 200 from disrupting the flow of the air coming from the aeration system 600, the gutter 202 here comprises an intermediate floor 520 between the bottom 203 and the opening. The intermediate floor 520 is at a distance from the bottom 203 and separates the gutter 202 into an upper gutter 521 in which the transport line 112*a-b* is fixed and a lower gutter 523 in which the air coming from the aeration system 600 circulates. The upper gutter 521 extends between the intermediate floor 520 and the cover 204, the lower gutter 523 extends between the bottom 203 and the intermediate floor 520.

To allow the air to pass from the lower gutter 523 to the upper gutter 521, the intermediate floor 520 includes openings and it is, here, pierced with holes 522 which make it possible to ensure a ventilation of the upper gutter 521.

Figure 4:
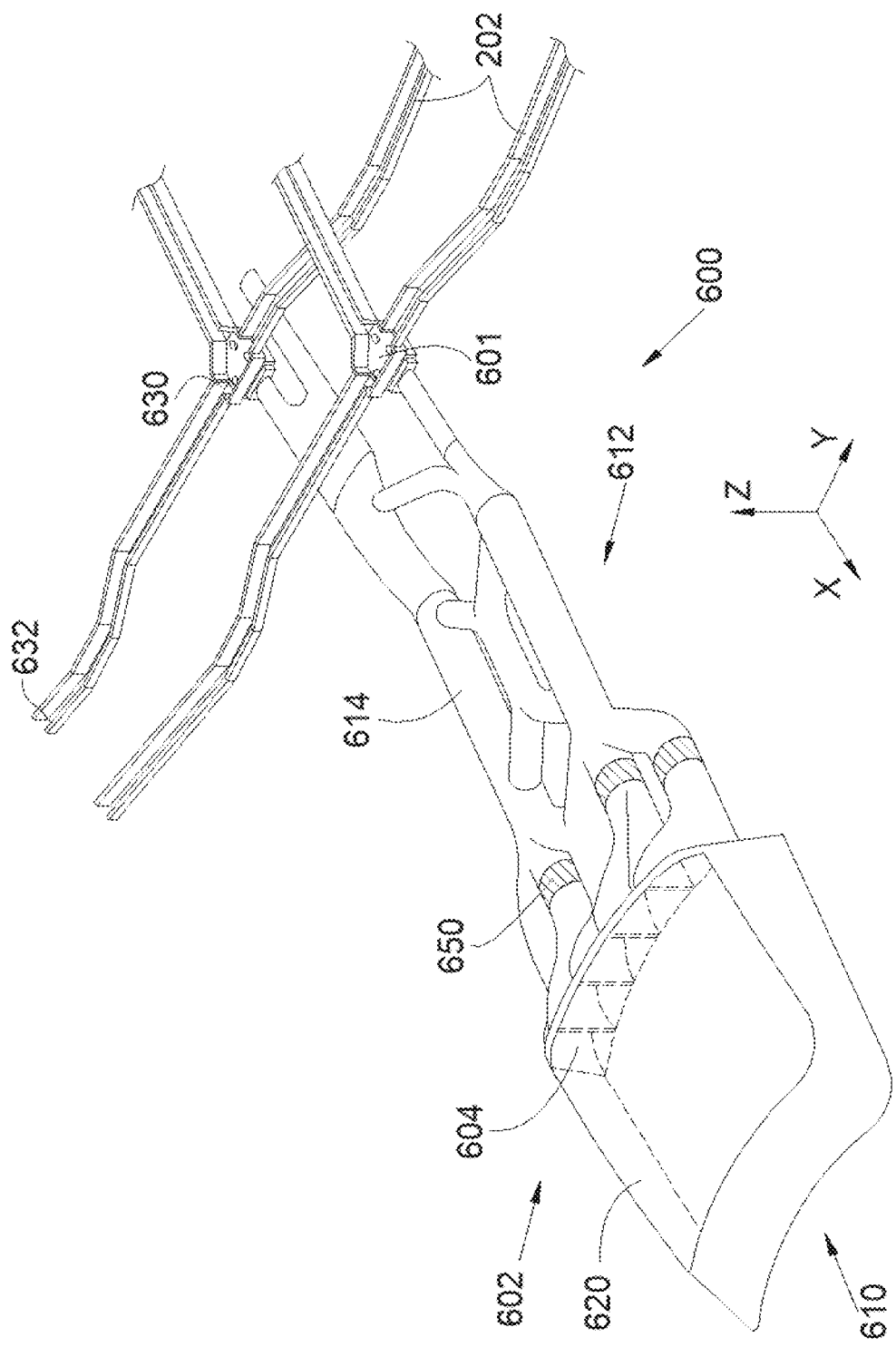
FIG. 4 is a perspective view of an example of embedded channels and of an aeration system that can be implemented in the invention.

FIG. 4 shows an example of the aeration system 600 with the gutters 202 but without the transport lines 112*a-b* which are housed in said gutters 202.

The aeration system 600 comprises an air vent 610 arranged to capture air outside the aircraft 100 and at least one intake line 614 fluidically connected to the air vent 610.

In the embodiment of the invention presented in FIG. 4, there is a plurality of intake lines 614 grouped together in an intake network 612, and each intake line 614 channels the air taken from the outside at the air vent 610 to one or more of the lower gutters 523 of the gutters 202. In the embodiment of the invention presented here, the air vent 610 can alternately take a closed position and an open position by virtue of a hatch 620 which is mounted to be movable between a closed position in which it isolates each window 604 from the outside air and an open position in which it is retracted to freely allow the passage of the outside air to each window 604. The displacement of the hatch 620 is ensured by any displacement system known to the person skilled in the art such as, for example, a motor or a hydraulic cylinder.

The air vent 610 comprises an air inlet 602 at which each intake line 614 emerges through a window 604 that is open towards the front of the aircraft 100 in order to capture the outside air when the aircraft 100 is advancing or is stopped.

At an intersection between an intake line 614 and one or more of the lower gutters 523, to ensure the distribution of the air to the or each lower gutter 523, the aircraft 100 here comprises a junction box 601 which ensures the fluidic connection between the intake line 614 and the or each lower gutter 523.

Thus, a flow of air entering into the junction box 601 will be diffused at the or each lower gutter 523.

In the embodiment of the invention presented in FIG. 4, to assist in the flow of the air in the intake lines 614, particularly when the aircraft 100 is on the ground, fans 650 are installed in one or more of the intake lines 614.

Each embedded channel 200 thus comprises a first end 630 by which the transport line 112a-b coming from upstream enters into the gutter 202 and a second end 632 by which the transport line 112a-b going downstream leaves the gutter 202. The first end 630 is therefore closest to the tank 110 and the second end 632 is closest to the consumer device 106.

For each second end 632, the aircraft 100 comprises an evacuation system 150 fluidically connected between the second end of the gutter 202, and more particularly here the lower gutter 523 of said gutter 202, and the outside of the aircraft 100. The evacuation system 150 which is represented schematically in FIG. 1, is intended to ensure the evacuation of the air and the water which are present in the gutter 202, and more particularly here in the lower gutter 523 of said gutter 202 and more generally the gases and the liquids present in the gutter 202. The evacuation system 150 is intended to evacuate only a part of the air present in the gutter 202. This evacuation system 150 is intended to maximize the flow of the air between the first and second ends 630, 632 of the embedded channel 200, in order to maximally dilute any possible leaks of dihydrogen.

Figure 5:
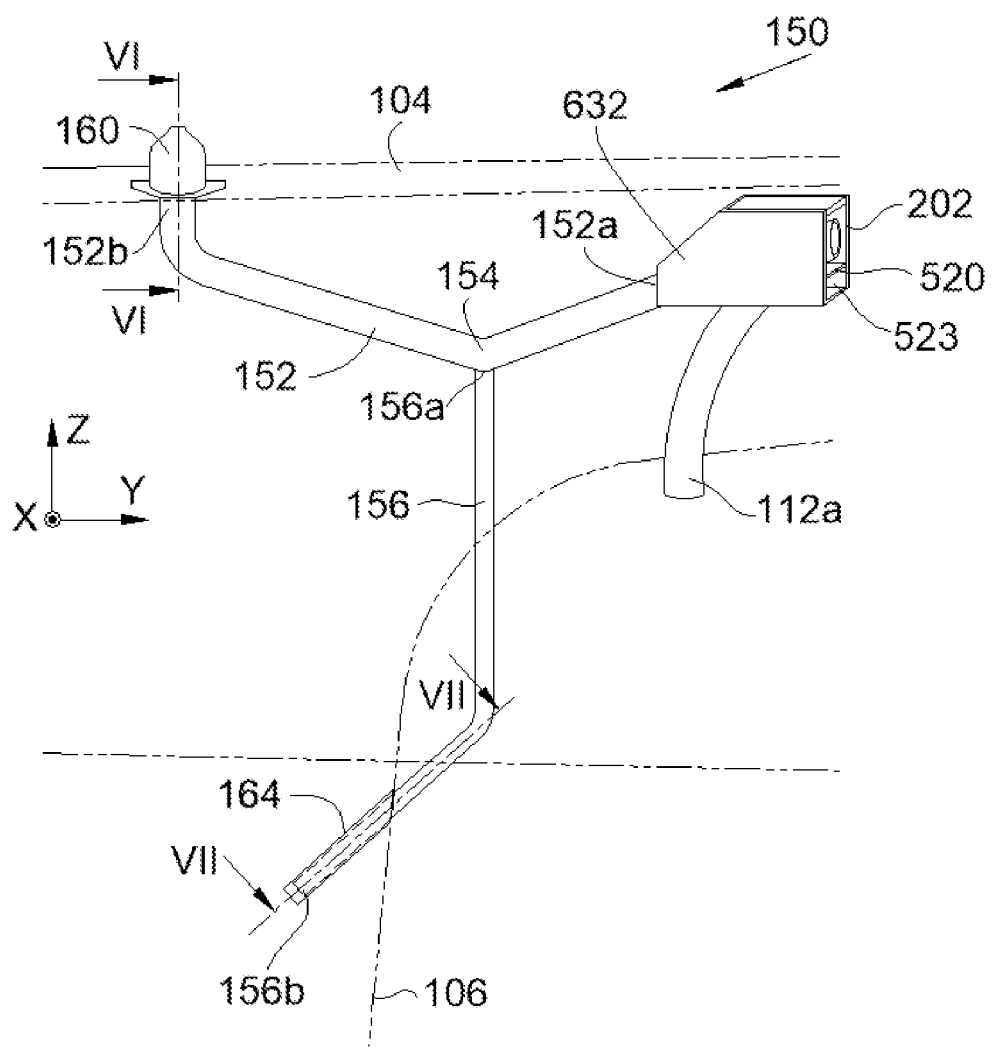
FIG. 5 is a perspective view of an air and water evacuation system according to the invention.
Figure 6:
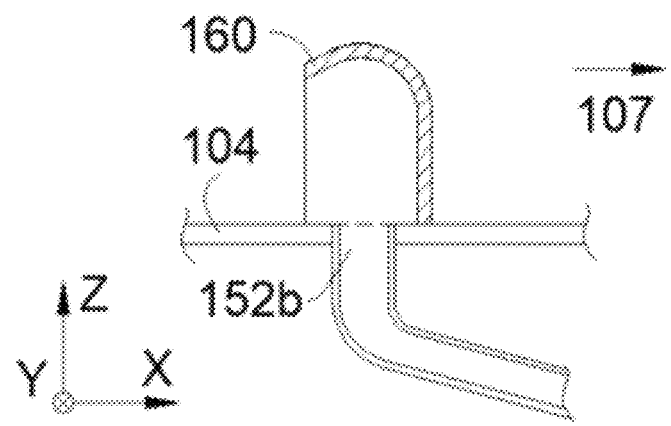
FIG. 6 is a cross-sectional view along the line VI-VI of the evacuation system of FIG. 5.
Figure 7:
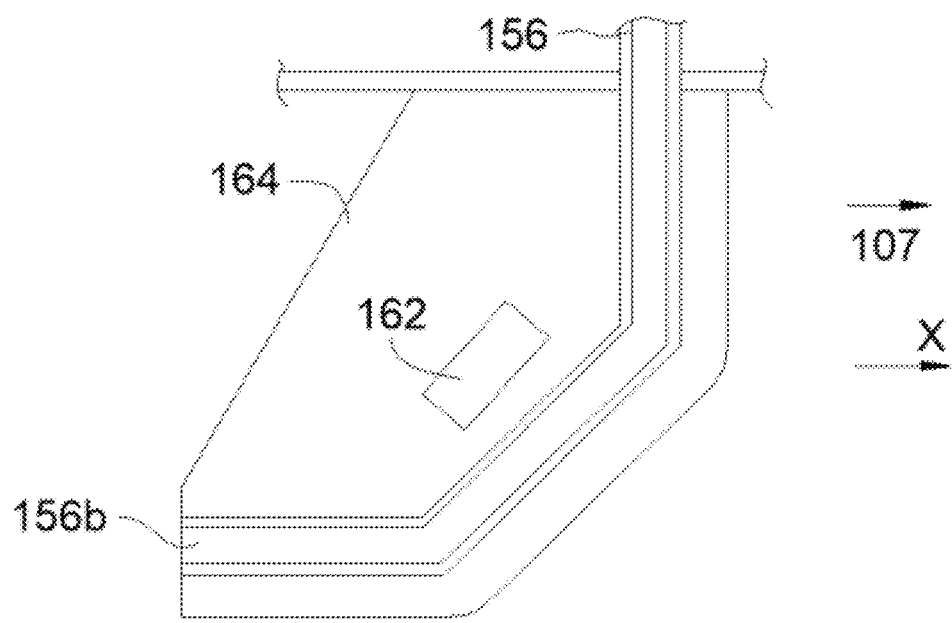
FIG. 7 is a cross-sectional view along the line VII-VII of the evacuation system of FIG. 5.

FIG. 5 shows an exemplary embodiment of the evacuation system 150 and FIGS. 6 and 7 show cross-sections of said evacuation system 150. The evacuation system 150 is, here, disposed in the wing 104 in the vicinity of the consumer device 106, here the propulsion system 106 which is supplied by the transport line 112a.

The evacuation system 150 comprises a first line 152 which has a proximal end 152a, a distal end 152b and a bend 154 between the proximal end 152a and the distal end 152b, in which the bend 154 constitutes a low point for the first line 152, that is to say that, between the proximal end 152a and the bend 154, on the one hand, and between the distal end 152b and the bend 154, on the other hand, the first line 152 has downward slopes.

The first line 152 is fluidically connected to the second end 632 of the gutter 202, here of the lower gutter 523 of said gutter 202, by its proximal end 152a and emerges outside the aircraft 100 at an outer wall of the aircraft 100, here the wing 104, by its distal end 152b. An outer wall of the aircraft 100 is in direct contact with the outside air surrounding the aircraft 100. For example, the distal end 152b of the first line 152 emerges on the upper surface of the wing 104 of the aircraft 100. In flight, a depression is created at the upper surface of the wing 104, and, since the first line 152 is fluidically connected by its distal end 152b to the upper surface of the wing 104, there is a suction of the outside air surrounding the aircraft 100 into the first line 152, which maximizes the air flow rate in said first line 152.

The first line 152 ensures the evacuation of the air and of the dihydrogen in the case of a leak from the transport line 112a in the gutter 202 by ensuring an evacuation over the entire length of said gutter 202. The first part of the first line 152, between its proximal end 152a and the bend 154, also ensures the evacuation of the water from the gutter 202. Indeed, the bend 154 corresponds to a low point of the first line 152, and it is at the bend 154 that the water is separated, by gravity, from the air and from the dihydrogen.

The evacuation system 150 comprises a second line 156 which has a proximal end 156a and a distal end 156b, in which the second line 156 is fluidically connected to the bend 154 by its proximal end 156a and emerges outside of the aircraft 100 at an outer wall of the aircraft 100, here of the consumer device 106, by its distal end 156b.

Between the proximal end 156a of the second line 156 and the distal end 156b of the second line 156, the second line 156 has a downward slope to ensure the flow of the water or of any other liquid to the outside and thus ensuring the drainage over the entire length of said gutter 202.

To improve the suction of the air or of the dihydrogen at the distal end 152b of the first line 152, the evacuation system 150 comprises a cap 160 which extends outside of the aircraft 100 around the distal end 152b by having a closed face oriented towards the front of the aircraft 100 and an open face oriented towards the rear of the aircraft 100. The gases present in the first line 152 are then sucked by the outside air by virtue of the speed of displacement of the aircraft 100. The cap 160 is fixed to the outer wall of the aircraft 100.

To prevent the water present in the second line 156 from freezing, the evacuation system 150 comprises a heating element 162, for example an electrically powered electrical resistor, which is disposed close to said second line 156.

Here, the heating element 162 is disposed in an aileron 164 in which the second line 156 is enclosed.

To take advantage of the suction of the outside air, the distal end 156b of the second line 156 is oriented towards the rear of the aircraft 100.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   at least one transport line in which dihydrogen flows, between, upstream a tank and downstream a consumer device,
   for each transport line, an embedded channel comprising a gutter in which said transport line is fixed and having a first end by which said transport line coming from upstream enters into the gutter and a second end by which said transport line going downstream leaves the gutter, and
   for each second end, an evacuation system fluidically connected between said second end of the gutter and the outside of the aircraft, the evacuation system comprising:
      a first line with a proximal end, a distal end and a bend between said proximal end and said distal end, the bend constituting a low point for the first line, and the first line being fluidically connected to said second end of the gutter by said proximal end and emerging outside at a first outer wall of the aircraft by said distal end, and
      a second line with a proximal end and a distal end, the second line being fluidically connected to the bend by said proximal end and emerging outside the aircraft at a second outer wall of the aircraft by said distal end, and, between the proximal end of the second line and the distal end of the second line, the second line having a downward slope.

2. The aircraft of claim 1, further comprising:
   a wing, wherein the distal end of the first line opens at an upper surface of the wing.

3. The aircraft of claim 1, wherein the evacuation system further comprises a cap which extends outside of the aircraft around the distal end of the first line by having a closed face oriented towards a front of the aircraft and an open face oriented towards a rear of the aircraft.

4. The aircraft of claim 1, wherein the evacuation system further comprises a heating element disposed closer to said second line than to said first line.

5. The aircraft of claim 1, wherein the distal end of the second line is oriented towards a rear of the aircraft.

* * * * *